United States Patent [19]

Kanev

[11] Patent Number: 4,914,307
[45] Date of Patent: Apr. 3, 1990

[54] OPTOELECTRONIC DEVICE FOR CONTACTLESS MEASUREMENT OF THE DIMENSIONS OF OBJECTS

[75] Inventor: Veselin Kanev, Turin, Italy
[73] Assignee: Artos Italia S.p.A., Turin, Italy
[21] Appl. No.: 195,314
[22] Filed: May 18, 1988
[30] Foreign Application Priority Data May 18, 1987 [IT] Italy ............................ 67430 A/87

[51] Int. Cl.⁴ .......................................... G01N 21/86
[52] U.S. Cl. ..................................... 250/560; 356/387
[58] Field of Search ............... 250/560, 561; 356/384, 356/385, 386, 387

[56] References Cited

U.S. PATENT DOCUMENTS

| | | | |
|---|---|---|---|
| 2,895,373 | 7/1959 | Eyraud | 356/387 |
| 3,193,689 | 7/1965 | Kerr | 250/560 |
| 3,774,040 | 11/1973 | Stephanos | 250/560 |
| 4,110,627 | 8/1978 | Isherwood | 250/560 |
| 4,260,260 | 4/1981 | Letort et al. | 356/385 |
| 4,267,443 | 5/1981 | Carroll et al. | 250/560 |
| 4,747,911 | 5/1988 | Polson | 356/387 |
| 4,773,029 | 9/1988 | Claesson et al. | 356/386 |

Primary Examiner—David C. Nelms
Attorney, Agent, or Firm—Sughrue, Mion, Zinn, Macpeak & Seas

[57] ABSTRACT

An optoelectronic device for the contactless measurement of objects includes an opaque hollow body with an opening for the introduction of the object to be measured. At least one emitter diode and an associated photovoltaic cell are arranged in the cavity of the body in a common plane perpendicular to the direction of introduction of the object to be measured. In use, an object introduced into the body in a predetermined direction can be interposed between the emitter diode and the photovoltaic cell so as to project on to the latter a shadow which is a function of its transverse dimensions. Conveniently, two intersecting emitter diode photovoltaic cell pairs can be arranged in the body.

5 Claims, 1 Drawing Sheet

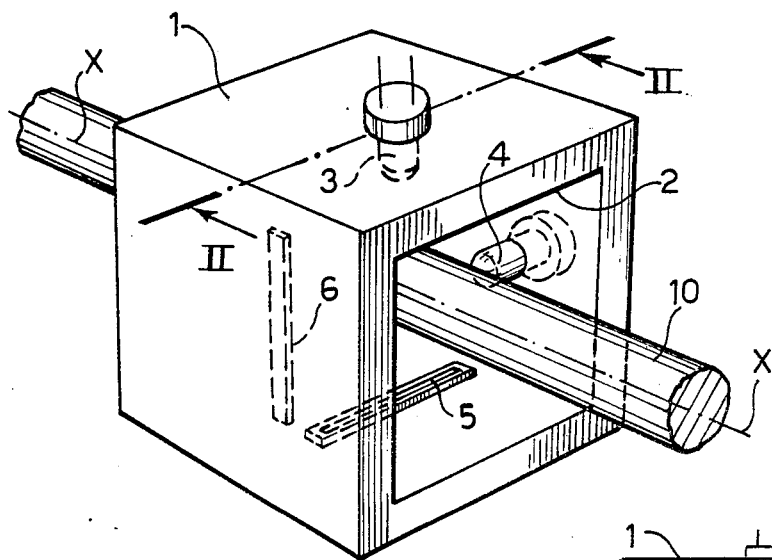
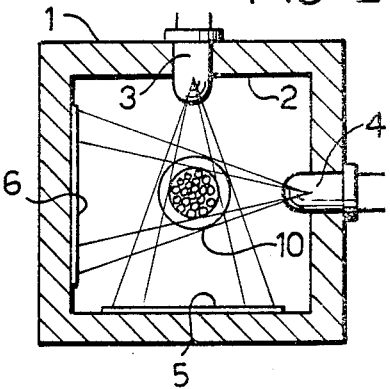
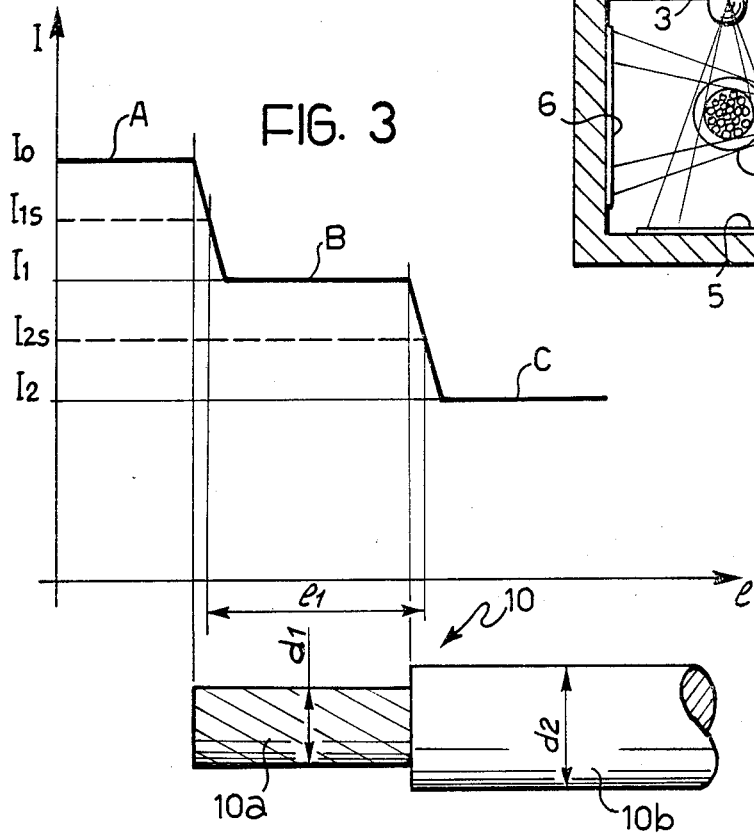

OPTOELECTRONIC DEVICE FOR CONTACTLESS MEASUREMENT OF THE DIMENSIONS OF OBJECTS

BACKGROUND OF THE INVENTION

The present invention relates to a device for measuring the dimensions of objects, particularly small objects having dimensions of the order of 0.1 mm. The object of the invention is to produce a device which is simple and economincal to manufacture, is very reliable and allows the dimensions (particularly the transverse dimensions) of a small object to be measured with a high resolution without mechanical contact.

SUMMARY OF THE INVENTION

This object is achieved according to the invention by means of an optoelectronic measuring device, characterised in that it comprises:

an opaque hollow body with an opening for the introduction of the object to be measured, at least one radiation emitter diode and a linear photovoltaic cell for generating an electrical signal indicative of the quantity of radiation received; the emitter diode and the photovoltaic cell being arranged in the cavity of the body in a common plane perpendicular to the direction of introduction of the object to be measured so that, in use, an object introduced into the body in the predetermined direction of introduction can be interposed between the emitter diode and the photovoltaic cell so as to project on to the latter a shadow which is a function of its transverse dimensions.

According to a further characteristic, the device according to the invention conveniently includes a further emitter diode-phovoltaic cell pair, preferably coplanar and at an angle of 90° to the first.

With measuring devices according to the invention the inventor has succeeded in determining the dimensions of objects having dimensions of the order of 0.1 mm, with a resolution of 0.01 mm or less.

BRIEF DESCRIPTION OF THE DRAWINGS

Further characteristics and advantages of the optoelectronic measuring device according to the present invention will become clear from the detailed description which follows, with reference to the appended drawings, provided purely by way of non-limiting example, in which:

FIG. 1 is a perspective view of an optoelectronic measuring device according to the present invention, FIG. 2 is a cross-section taken on the line II—II of FIG. 1, and FIG. 3 is a graph which shows an example of the variation of a current generated by a photovoltaic cell of the device according to the invention in relation to the dimensions of a body to be measured, introduced into the device.

DETAILED DESCRIPTION OF THE INVENTION

In the embodiment illustrated, an optoelectronic device according to the invention comprises a squaresectioned, tubular body 1 of opaque material. A cavity 2 is defined in the body and extends along the axis X-X of the body 1 and, in the embodiment illustrated, is opened at both ends of the body.

Two emitter diodes 3 and 4 are fixed in the central region of two adjacent walls of the body 1 in a common transverse plane of the body, as seen in FIGS. 1 and 2. The emitter diodes 3 and 4 can consist, for example, of light-emitting diodes. The radiation emitted by these diodes may be visible or infrared.

Two linear photovoltaic cells 5 and 6 are fixed to the other two walls of the body 1 in the cavity 2 in the same plane as that in which the emitter diodes 3 and 4 are mounted, the first facing the emitter diode 3 and the second facing the emitter diode 4, as shown particularly in FIG. 2. These photovoltaic cells are able to generate electrical signals indicative of the quantity of radiation received.

The emitter diodes 3, 4 and the photovoltaic cells 5, 6 are connected to an electronic circuit (not illustrated) for their supply and for the processing of the signals provided by the photovoltaic cells 5 and 6.

An elongate cylindrical object whose transverse dimensions are to be measured by the optoelectronic device described above is indicated 10 in FIGS. 1 and 2. This object is introduced into the cavity 2 of the body so that its axis coincides with the axis of the body. For this purpose, centering devices of known type, not illustrated, can be provided at the entrance to and/or at the exit from the body 1. The body 10, being interposed between the emitter diodes 3 and 4 and the associated photovoltaic cells 5 and 6, projects on to these latter a shadow whose extent is indicative of the transverse dimensions of the body. This shadow causes a reduction in the level of the signal provided by the photovoltaic cells 5 and 6 and, from this reduction in signal, it is possible to deduce the transverse dimensions of the object 10.

The optolectronic measuring device according to the invention can be used, amongst other things, for the contactless inspection of electrical wires or cables provides with insulating coverings to check whether predetermined portions thereof have been stripped, or to check whether terminals and the like have been clamped on to their ends.

FIG. 3 shows a cylindrical object 10 which has two axial portions 10a and 10b of different diameters $d_1$ and $d_2$. In the same Figure a graph is reproduced showing the variation in the current I provided by one of the photovoltaic cells 5 and 6 during the measuring of the object 10, illustrated in the same figure, as a function of its length.

The graph which shows the variation in the current I has a first part A in which the current is substantially constant at a value $I_O$, which is the value of the current generated by the photovoltaic cells when no bodies are interposed between them and the emitter diodes.

When the body 10 of FIG. 3 is interposed between the emitter diodes and the photovoltaic cells, the current provided by the latter remains constant at a value $I_1$ (part B of the graph of FIG. 3) as long as the portion 10a of the body 10 is interposed between the emitter diodes and the photovoltaic cells, and then assumes a substantially constant value $I_2$ (part C of the graph of FIG. 3) when the portion 10b is interposed.

The current values $I_1$ and $I_2$ are indicative of the diameters $d_1$ and $d_2$ of the two portions of the body 10 being measured. This body can consist, for example, of a length of electrical cable whose end 10a has been stripped.

If the current I is compared with constant current value $I_{1s}$ and $I_{2s}$ (see FIG. 3), it is possible to determine the start of the portion 10a of the body 10 and the transition from the portion 10a to the portion 10b. Moreover, if the speed of passage of the body 10 through the measuring device is constant, the interval between the times at which the current I crosses the threshold levels is also directly correlated with the length $l_1$ of the portion 10a of the body 10. The electronic control and processing circuit (not illustrated) associated with the measuring device can easily be arranged to provide indications both of the transverse dimensions of the objects being measured and of the length of its portions defined by successive variations in section.

Devices for the visual display of the values measured and/or devices for interfacing with other processing or recording equipment, for example processers, recording instruments, printers, etc. can be connected to this circuit.

The device according to the invention can also be used to supply enabling and control signals to operating machines which are to carry out further operations or processes on the objects measured.

I claim:

1. A device according to the contactless measuring of the dimensions of an object comprising
    an opaque hollow body with an opening for the introduction of the object to be measured,
    at least one radiation emitter diode and a linear photovoltaic cell for generating an electrical signal indicative of the quantity of radiation received; the emitter diode and the photovoltaic cell being arranged in the cavity of the body in a common plane perpendicular to the direction of introduction of the object to be measured so that, in use, an object introduced into the body in the predetermined direction of introduction can be interposed between the emitter diode and the photovoltaic cell so as to project on to the latter a shadow which is a function of its transverse dimensions.

2. A device according to claim 1, further including a second emitter diode and an associated second linear photovoltaic cell arranged in the cavity of the body in a common plane perpendicular to the direction of introduction of the object to be measured and facing each other along a line which is inclined to the line along which the first emitter diode and the first photovoltaic cell face each other.

3. A device according to claim 2, wherein the the second emitter diode and the second photovoltaic cell are coplanar with the first emitter diode and the first photovoltaic cell.

4. A device according to claim 2, where the line along which the first emitter diode and the first photovoltaic cell face each other is perpendicular to the line along which the second emitter diode and the second photovoltaic cell face each other.

5. A device according to claim 1, wherein the cavity of the body is quadrilateral-shaped.

* * * * *